United States Patent [19]

Shiga

[11] Patent Number: 4,616,608
[45] Date of Patent: Oct. 14, 1986

[54] BALANCER DEVICE FOR A RECIPROCATING ENGINE

[75] Inventor: Mitsuo Shiga, Saitama, Japan

[73] Assignee: Honda Giken Kogyo Kabushiki Kaisha, Tokyo, Japan

[21] Appl. No.: 676,006

[22] Filed: Nov. 29, 1984

[30] Foreign Application Priority Data

Dec. 1, 1983 [JP] Japan .................. 58-184589[U]

[51] Int. Cl.⁴ .............................................. F16F 15/26
[52] U.S. Cl. ............................. 123/192 B; 123/74 AE
[58] Field of Search ............. 123/192 R, 192 B, 73 R, 123/74 AE, 317; 74/603, 604

[56] References Cited

U.S. PATENT DOCUMENTS

| | | | |
|---|---|---|---|
| 2,235,160 | 3/1941 | Ljungstrom | 123/192 B |
| 3,759,238 | 9/1973 | Irgens | 123/192 B |
| 4,440,123 | 4/1984 | Tsai | 123/192 B |
| 4,465,029 | 8/1984 | Matsumoto | 123/192 B |

Primary Examiner—Willis R. Wolfe, Jr.
Attorney, Agent, or Firm—Lyon & Lyon

[57] ABSTRACT

An engine for a small vehicle of the two-stroke type having a separate balance chamber with a wall between the crankshaft chamber and the balance chamber. The balancer includes weights whose path of rotation are displaced to either side of the path of rotation of the crankweight. The intermediate wall between chambers includes three sections to accommodate the path of travel of the balancer weights to either side of the crank weights.

4 Claims, 3 Drawing Figures

BALANCER DEVICE FOR A RECIPROCATING ENGINE

BACKGROUND OF THE INVENTION

The field of the present invention is balancers for reciprocating engines.

Two-stroke engines of the crankcase compression type employ the volume within the crankcase, including the volume beneath the piston, for compression of air fuel mixture through the actuation of the piston within its cylinder. To achieve proper performance, limitation of the open volume within the crankcase is beneficial. As a means for limiting such volume, separate balancers spaced from the crank have been employed. By employing a separate balancer, free volume within the crankcase may be reduced. However, such balancers have been positioned outwardly of the crank weight, creating an excessively bulky arrangement. With small vehicles, the additional space required for such devices can be objectionable.

SUMMARY OF THE INVENTION

The present invention is directed to a compact balancer mechanism adjacent a crank chamber and not contained therein. To gain added compactness, the balancer weights are displaced to either side of the crank weight such that a wall may be interposed between the chamber of the balancer and the crank chamber. The resulting configuration is such that the balancer shaft may be located at a distance from the crankshaft which is less than the sum of the maximum radii of the balancer and the crankshaft.

The foregoing arrangement provides for a compact crankcase design of substantial advantage for small vehicles and of particular utility with two-stroke type engines. Accordingly, it is an object of the present invention to provide an improved reciprocating engine arrangement employing such a balancer. Other and further objects and advantages will appear hereinafter.

DETAILED DESCRIPTION OF THE PREFERRED EMBODIMENT

Figure 1:
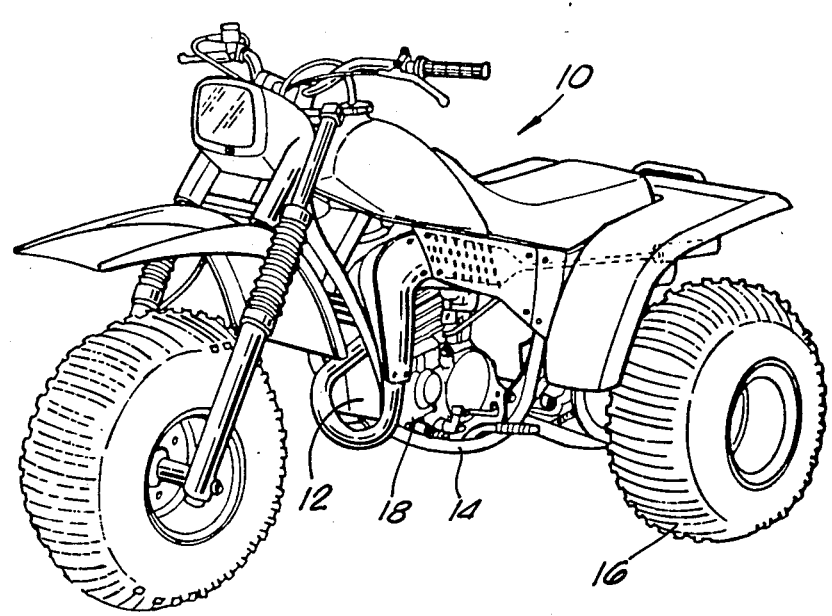
FIG. 1 is an oblique view of a three-wheeled small vehicle which may employ the present invention.
Figure 2:
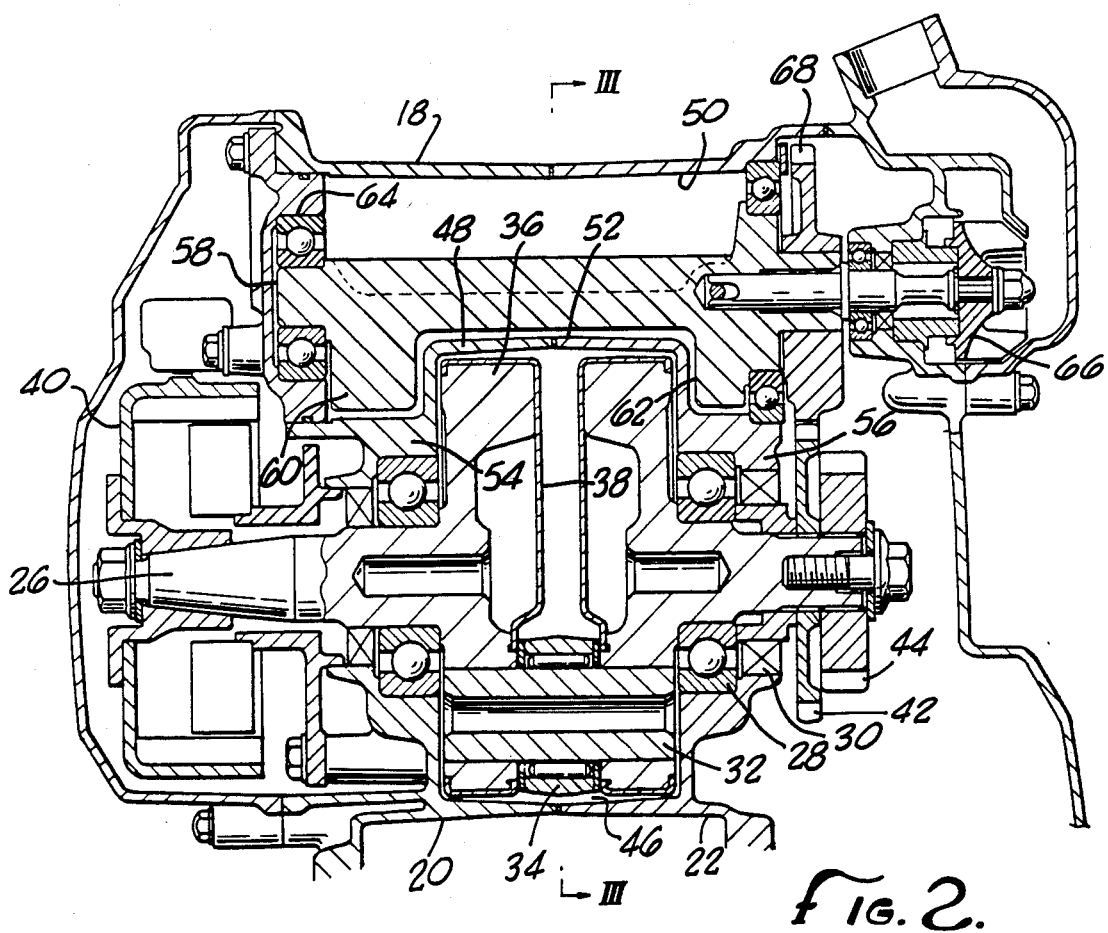
FIG. 2 is a cross-sectional view of a crankcase employed in the present invention.

Turning in detail to the drawings, a vehicle, generally designated 10, is disclosed as having an engine 12 mounted within a frame 14 conventionally supported on wheels 16. The engine includes a crankcase 18 more fully illustrated in FIGS. 2 and 3.

Figure 3:
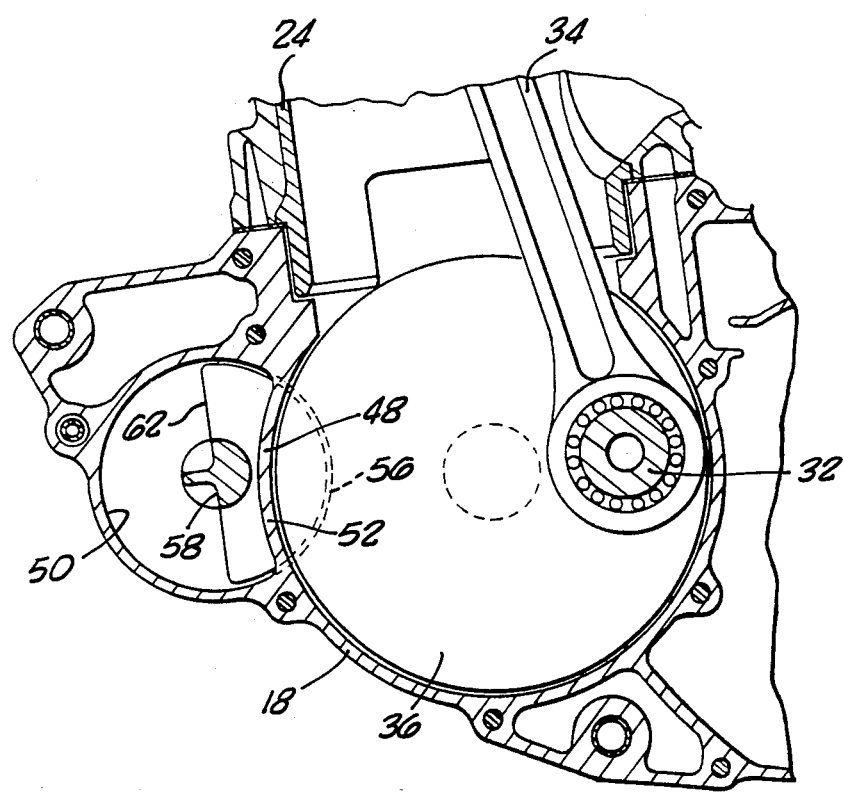
FIG. 3 is a cross-sectional elevation taken along line III—III of FIG. 2.

The crankcase 18 is shown to be divided into two halves 20 and 22 along a part line perpendicular to the crankshaft of the engine. The crankcase 18 is assembled with a cylinder 24 as can be seen in FIG. 3. A crankshaft 26 is rotatably mounted in the crankcase 18 employing bearings 28 and seals 30. The crankshaft 26 includes a crankpin 32 to which is coupled a connecting rod 34.

The crankshaft 26 is particularly formed for a two-stroke engine and employs a circular weight structure 36 into which the crankpin 32 is positioned. The crank weight 36 is divided by a passage 38 to accommodate the connecting rod 34. As can be seen from FIG. 2 and from FIG. 3, the crank weight 36 substantially fills the lower portion of the crank chamber of the crankcase 18. Located at one end of the crankshaft 26 is a generator 40. At the other end of the crankshaft 26 there is located gears 42 and 44.

The crank chamber 46 is defined by the crankcase 18, including a portion of the crankcase 18 forming an inner wall 48. The wall 48 closely fits about the crank weight 36 as does the remainder of the crankcase chamber 46. The wall 48 also acts to define in part a balance chamber 50 adjacent to the crank chamber 46. The balance chamber 50 is additionally defined by the outer wall of the case 18 as can best be seen in FIG. 3.

The wall 48 between the two chambers is arranged such that it is defined in three sections, 52, 54 and 56. The first section 52 is located centrally in the wall 48. This section extends inwardly into the area of the balance chamber beyond that of the sections 54 and 56. This first section 52 is concave with respect to the interior of the crank chamber 46 to provide a relatively close fit about the crank weight 36. The outer sections 54 and 56 located to either side of the first section 52 define a concave surface toward the balance chamber 50. The entire wall 48 divides the two chambers so that there is no communication therebetween.

Located within the balance chamber 50 is a balance shaft assembly 58. The balance shaft assembly 58 includes a balance shaft and balance weights 60 and 62. The overall assembly 58 is generally integrally formed as one piece. Bearings 64 provide rotational mounting for the assembly. The weights 60 and 62 are shown to pass on either side of the first section 52 close to the concave surfaces of the sections 54 and 56. As a result, there is a partial interdigitating of the weights 60 and 62 with the weight 36 therebetween at portions of the rotation. This clearly results in a reduction in overall width of the assembly which would otherwise require the weights 60 and 62 to have a path of travel which is outwardly of the crankshaft weight 36.

Associated with the end of the balance shaft assembly 58 is a water pump assembly 66. Fixed to the shaft assembly 58 is a gear 68 which meshes with the gear 42 on the crankshaft 26 to drive the balance weight assembly 58 synchronously with the crankshaft.

Thus, a compact balance mechanism in association with a reciprocating engine is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A reciprocating engine, comprising
   a crankcase having a crank chamber and a balance chamber and a wall between said crank chamber and said balance chamber, said wall including three sections, a first section concave to said crank chamber, and second and third sections concave to said balance chamber, said second and third sections being to either side of said first section and said first section extending toward said balance chamber beyond a projection of the concave surfaces of said second and third sections;
   a crankshaft rotatably mounted in said crank chamber; and a balance shaft rotatably mounted in said balance chamber and having balance weights on said shaft positioned and arranged to pass to either side of said first section when rotated with said shaft.

2. The engine of claim 1 wherein said wall is constructed and arranged to seal said crank and balance chambers from each other.

3. The engine of claim 1 wherein said balance weights and said balance shaft are integrally formed.

4. The engine of claim 1 wherein said balance shaft has an eccentric center of gravity displaced toward said balance weights.

* * * * *